(No Model.)
C. ROSENHOLZ & J. W. CARLSON.
BICYCLE BELL.
No. 586,344. Patented July 13, 1897.
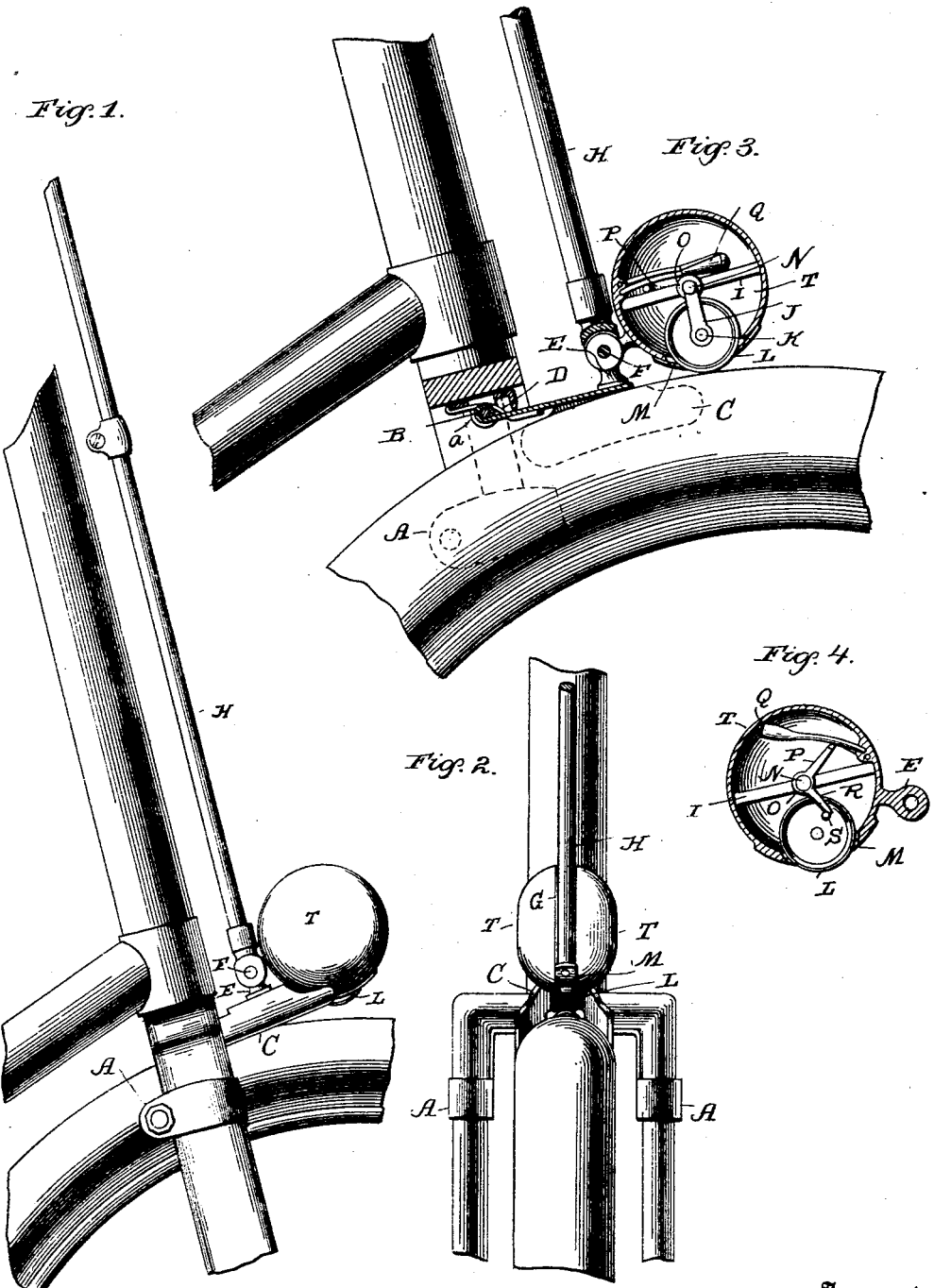
Witnesses
Victor J. Evans
W. M. Mason
Inventor,
Carl Rosenholz.
John W. Carlson.
by John Wedderburn
Attorney

UNITED STATES PATENT OFFICE.

CARL ROSENHOLZ AND JOHN W. CARLSON, OF WARDNER, IDAHO.

BICYCLE-BELL.

SPECIFICATION forming part of Letters Patent No. 586,344, dated July 13, 1897.

Application filed August 3, 1896. Serial No. 601,541. (No model.)

*To all whom it may concern:*

Be it known that we, CARL ROSENHOLZ and JOHN W. CARLSON, citizens of the United States, residing at Wardner, in the county of Shoshone and State of Idaho, have invented certain new and useful Improvements in Bicycles; and we do hereby declare the following to be a full, clear, and exact description of the invention, such as will enable others skilled in the art to which it appertains to make and use the same.

This invention relates to bicycles, and more particularly to brake mechanism therefor; and it has for its objects, among others, to provide a simple and cheap construction of brake so arranged with relation to a bell that when the brake is applied the bell will be caused to ring. The bell is mounted upon the brake-shoe upon the pivot or stud to which the brake-rod is attached, and as the brake is thrown down in contact with the wheel the bell is moved into position, so that a small wheel engages with the periphery of the wheel of the machine and is thus rotated and causes the bell to ring.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side elevation showing the application of the invention. Fig. 2 is a front view of the bell and the actuating mechanism therefor. Fig. 3 is a section through the pivot of the brake-rod. Fig. 4 is an enlarged section of the interior mechanism of the bell.

Like letters of reference indicate like parts in the several views.

Referring now to the details of the drawings by letter, A designates a clamp designed to be attached to the frame of the machine in any suitable manner in the desired position. The transverse portion of this clamp has ears *a* depending therefrom, in which is supported a shaft B, on which is pivotally mounted the brake-shoe C, which may be of any desired form of construction adapted to engage the periphery of the wheel of the bicycle, and a spring D is employed, which is coiled around this pivot with its ends bearing against the clamp and a portion bearing against the brake-shoe to normally hold the same away from engagement with the periphery of the wheel of the bicycle.

Rising from the brake-shoe near its free end is a lug or stud E, bifurcated, as shown, and in this bifurcation is pivoted on a pivot F the ring or body portion G of the bell. Also mounted upon this pivot is the lower bifurcated end of the brake-rod H, adapted to be actuated from the seat or saddle in any of the well-known ways.

Within the ring or body portion of the bell is arranged the arm I, from which depends the arm J, in which is supported a shaft K, on which is loosely mounted the wheel L, which works through an opening in the ring, as seen at M, and adapted to engage the periphery of the wheel of the bicycle.

N is a transverse shaft on which is loosely sleeved the sleeve O, having an arm P extended transversely with the shaft and arranged beneath the bell-hammers Q, mounted upon independent pivots for independent movement. This sleeve has an arm R extended into the path of a wrist-pin S on the wheel, as shown. T are the bells or heads of the bell removably engaged with the screw-threaded ends of the transverse shaft.

With the parts constructed and arranged substantially as hereinbefore set forth the operation will be apparent and, briefly stated, is as follows: Normally the bell and the brake-shoe are held away from and out of engagement with the periphery of the wheel of the bicycle by the spring. As the brake-shoe is forced down by the lever into contact with the periphery of the wheel the bell also moves therewith until the small wheel thereof engages the periphery of the wheel of the bicycle, and the rotation of the said wheel causes the bell to ring.

Modifications in details may be resorted to without departing from the spirit of the invention or sacrificing any of its advantages.

It will be observed that by the construction shown the bell may be caused to ring without applying the brake.

Having thus described the invention, what is claimed as new is—

1. The combination with a brake-shoe, of a bell pivotally mounted thereon, and means connected with the bell adapted to be sounded by rotation of the wheel of a bicycle with which it is thrown into contact, substantially as described.

2. The combination with a pivotally-mounted brake-shoe, of a bell pivotally mounted thereon and on a brake-rod pivotally connected with the pivot of the bell, substantially as described.

3. The combination with a pivotally-mounted brake-shoe, of a bell pivotally mounted thereon and a brake-rod connected with the pivot of the bell, and a wheel projecting beyond the periphery of the bell and engaging the wheel of the machine, substantially as described.

4. The combination with a pivotally-mounted brake-shoe, of a bell pivotally mounted thereon and a brake-rod connected with the pivot of the bell, and a wheel projecting beyond the periphery of the bell and engaging the wheel of the machine, and a bell-hammer-actuating mechanism operated by said wheel, substantially as described.

5. The combination with the body portion of a bell with the transverse arm therein, of a shaft mounted in said arm, an arm depending from the shaft, a wheel carried by a shaft journaled in the depending arm and projecting through an opening in the bell, a pivoted bell-hammer, a stud projecting from said wheel, and a sleeve mounted upon said shaft and having arms one adapted to be engaged by said stud and the other to actuate the bell-hammer substantially as described.

In testimony whereof we have signed this specification in the presence of two subscribing witnesses.

CARL ROSENHOLZ.
JOHN W. CARLSON.

Witnesses:
ANNA KINKADE,
SABELLE W. GYDE.